United States Patent [19]

Sarkisian et al.

[11] Patent Number: 5,205,467
[45] Date of Patent: Apr. 27, 1993

[54] SPF/DB GAS NEEDLE IMPROVEMENT

[75] Inventors: Seb R. Sarkisian, Torrance; George W. Stacher, Westminster; Arthur Martinez, Pico Rivera, all of Calif.

[73] Assignee: Rockwell International Corporation, Seal Beach, Calif.

[21] Appl. No.: 753,466

[22] Filed: Sep. 3, 1991

[51] Int. Cl.$^5$ .................. B23K 20/00; B23K 31/02; B23P 17/00

[52] U.S. Cl. ..................... 228/157; 228/190; 228/193; 29/423

[58] Field of Search ............ 228/157, 181, 190, 193; 29/404, 423

[56] References Cited

U.S. PATENT DOCUMENTS 3,110,961 11/1963 Melill et al. .................. 228/181
3,168,782 2/1965 Cochran ...................... 228/190
3,345,735 10/1967 Nicholls ....................... 29/423
4,784,312 11/1988 Gotoh .......................... 228/157

Primary Examiner—Richard K. Seidel
Assistant Examiner—Jeffrey T. Knapp
Attorney, Agent, or Firm—Terrell P. Lewis; Charles T. Silberberg

[57] ABSTRACT

Dummy needles are used for preventing closure of gas-conveying passageways communicating the interior, and provided at the peripery, of a multi-sheet stack of titanium alloy materials during diffusion bonding. After the diffusion bonding has been carried out, the dummy needles fitted within the passageways are removed, the passageways are reamed out to ensure their circular shape, and needles adapted for superplastic forming are inserted into the newly reamed passageways.

7 Claims, 1 Drawing Sheet

SPF/DB GAS NEEDLE IMPROVEMENT

BACKGROUND OF THE INVENTION

1. Field of the Invention

The present invention relates to methods of fabrication of structural units from titanium alloy materials, and more particularly to methods for preventing blockage or closure of fluid conveying gas passageways communicating the interior, and provided at the periphery, of a multi-sheet stack of titanium alloy materials.

2. Background of the Invention

The family of titanium alloys, including titanium aluminide materials, have become well known in the metallurgical arts for their excellent high-temperature strength and oxidation and creep resistance characteristics.

Titanium aluminides, like other titanium alloys, are typically brittle and difficult to process and/or fabricate at or near room temperatures. Two fabrication techniques which have found widespread utility in the fashioning of structures for various industries are diffusion bonding (DB) and superplastic forming (SPF).

Diffusion bonding refers to the metallurigical joining of surfaces of similar or dissimilar metals by the application of heat and pressure for a time duration so as to cause a co-mingling of atoms at the joint interface.

Superplastic forming refers to a forming process in which a metal, under high temperature and pressure conditions, exhibit unusually high tensile elongations with minimal necking. Titanium alloys are one of only a few metals which exhibit these "superplastic" properties.

The fabrication of structural units made of multi-layered stacks of titanium aluminide materials is made easier by utilization of the metallurgical processes of diffusion bonding and superplastic forming. Multi-layer stacks generally comprise three or more stacked sheets of metal selectively stopped-off to facilitate bonding of only predetermined surface regions of facing sheets.

Prior to bonding, the stack of sheets is typically fitted with long (on the order of about 25 inches), slender, flexible gas-conveying tubing or "needles" at various peripheral locations for communicating the interior of the stack with a source of pressurized gas located outside the stack. These needles enable conveyance of the pressurized gas to the stack interior for effecting superplastic forming subsequent to carrying out the diffusion bonding step.

A serious problem has arisen which is addressed by this invention. Typically, the gas needles which have been mounted in openings located at the periphery of the stack extend outwardly from that periphery. During the diffusion bonding process, both the needles and the stack, although housed within a stainless steel protective retort, are subject to pressures of a diffusion bonding magnitude. While the principal aim of applying such pressures is to effect diffusion bonding of selected surfaces within the stack of sheets, the pressure is also sufficient to crush the needles along their entire length up to the periphery of the stack. As a result, it has been found necessary to replace the needles prior to effecting gas expansion during the subsequent superplastic forming step. This is terribly time consuming, expensive and inconvenient. In addition, there is a tendency for the passageways at the periphery of the stack within which the needles are fitted to close down.

OBJECTS AND SUMMARY OF THE INVENTION

It is therefore an object of the present invention to provide a novel method for minimizing damage, during application of diffusion bonding pressures, to openings provided for gas conveying needles at fitting locations at selected peripheral regions of a stack of titanium aluminum alloy sheets.

Another object of the present invention is to provide a new apparatus for protecting the end regions of short gas needles against being crushed or otherwise severely damaged during the application of diffusion bonding pressures.

Still another object of the invention is to provide a new method for replacing severely damaged gas needles following application of the diffusion bonding pressures, where the replacement requires only a minimum of effort and inconvenience.

The novel apparatus comprises spacer blocks provided with cut-out regions configured in such a manner as to contain and protect the free end regions of the gas needles extending from the periphery of the sheet metal stack. The novel method of replacing the severely damaged needles comprises removing the damaged needles after effecting the diffusion bonding process, reaming out the initially formed needle-retaining openings to their pre-diffusion bonding internal diameter (ID) (or larger, if necessary), and inserting and securing in the openings new needles of an outer diameter (OD) which matches the internal diameter of the newly-reamed opening.

DETAILED DESCRIPTION OF THE INVENTION

Figure 1:
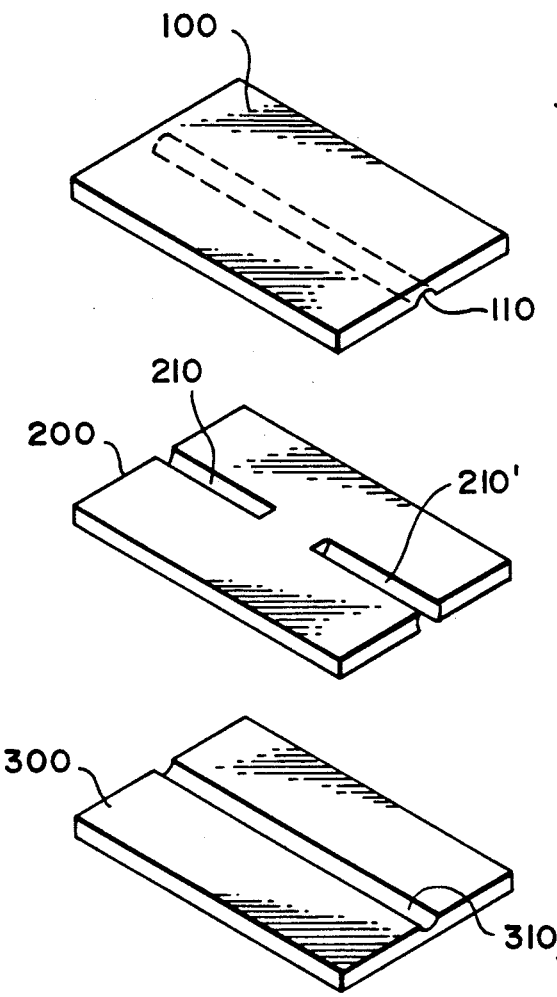
FIG. 1 is an exploded view of a stack of three titanium alloy sheets, generally showing the sheets overlying one another and including needle-housing groove constructions which allows placement of the needles in appropriate locations about the periphery of the stack.

A stack of titanium alloy sheets is shown in FIG. 1 includes an upper face sheet 100, a middle core sheet 200 and a bottom face sheet 300. Each of the face sheets is provided with a groove 110, 310 extending in the same direction and substantially overlying one another. The middle core sheet 200 includes slots 210, 210' each extending from an edge of the core sheet inwardly toward a central region thereof and toward one another. As shown in the FIG. 1, the slots are disposed substantially coaxially with the grooves and are captured between the face sheets such that when the three sheets are assembled to form a stack, the grooves and slots together coact to define passageways (see FIG. 2) leading from the peripheral region of the stack to an interior region thereof, where a network of fluid-conveying channels has been formed to facilitate expansion during the step of superplastic forming.

Figure 2:
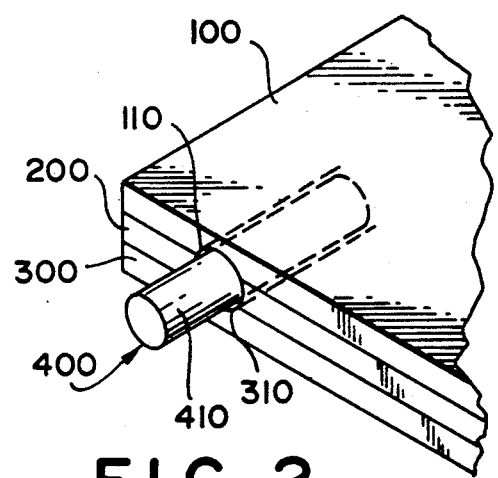
FIG. 2 illustrates one end region of an assembled three-sheet stack showing the manner in which a needle is secured in the stack of sheets.

FIG. 2 shows a portion of the assembled stack of sheet at which one of the passageways is located. As shown, a dummy needle 400 is disposed within the passageway. The needle includes a short stub portion 410 which has a length of a predetermined amount located outside the peripheral region of the stack. Preferably, the stub portion of the needle will have a diameter on the order of 0.060" external diameter and will fit snugly within the passageway defined by the opposing face sheets 100, 300 and the core sheet 200.

Figure 3:
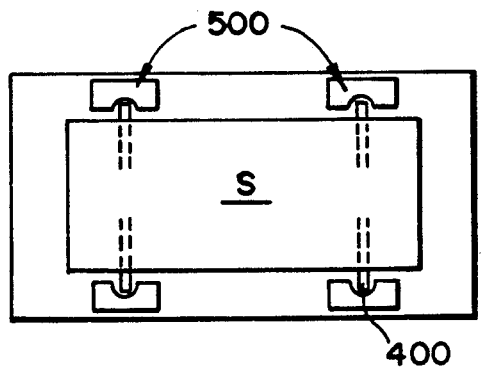
FIG. 3 is a top view of a stack of metallic sheets disposed on the bottom sheet of a retort, showing a preferred placement of the needles in the stack and the disposition of spacer blocks adjacent the needles for protecting the needle ends against crushing during the diffusion bonding stage.

In FIG. 3, there is shown a top view of multi-sheet stack S which has been disposed on a bottom one of the sheets of a retort prior to being enclosed and sealed between the bottom and the top sheets. In the vicinity of the corners of the stack are shown the short stub portions of the dummy gas needles protruding from the interior of the stack through passageways to the ambient. Disposed adjacent to each of the stub portions 410 of the dummy needles is a spacer 500.

Figure 4:
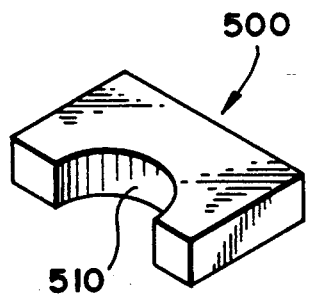
FIG. 4 is a perspective view of one of the spacer blocks shown in FIG. 3.

As seen in FIG. 4, each spacer 500 comprises a block of generally rectangular or square configuration modified by the provision, at one side thereof, of an arcuate recess 510. The recess is configured to snugly receive and protectively house the stub portion of one of the dummy needles. Preferably, the spacer is fabricated from steel, and has a height which is greater than or equal to the diameter of the stub portion of the dummy gas needle which it protects.

In using the apparatus of the invention, an assembled stack including dummy gas needles is placed on the bottom sheet of a retort, and just before the stack is covered with the top sheet, the spacers 500 are placed adjacent the dummy needles with the stub portions of the dummy needles housed within the arcuate recess 510 of the spacer. During the diffusion bonding process used for bonding the preselected areas of the sheets of the stack, the dummy gas needle stub portions are prevented from being crushed by the blocks during application of diffusion bonding magnitude pressures. However, during this bonding process, the passageways in which the dummy needles have been fitted distort from their originally substantially circular shape to a substantially ovoid shape, even with the use of the spacer blocks and dummy needles. It is therefore necessary, after completion of the bonding process and removal of the retort from the stack, to remove the dummy needles and ream out the passageways to obtain a circular shape. Then the stack can be outfitted with the new, long slender needles and readied for the following step of superplastic forming.

While certain representative embodiments and details have been shown for the purpose of illustrating the invention, it will be apparent to those skilled in this art that various changes and modifications may be made therein without departing from the spirit of scope of this invention.

What I claim is:

1. A method for preventing crushing of passageways terminating at the periphery of a stack of sheets of titanium aluminide material during diffusion bonding of said stack within a protective retort, the passageways extending into and through the interior of the stack for fluidly communicating said interior with a source of gas located outside said stack for effecting superplastic forming following said diffusion bonding, said method comprising:

inserting a dummy needle within each of said passageways at said stack periphery such that one end of said needle is lodged within said passageway and the opposite, free and extends outwardly of said passageway beyond the periphery of said stack;

disposing a crush-proof housing adjacent the free end of each of said needles so that said free end is maintained in a protected state during diffusion bonding, and replacing said dummy needles after completion of said diffusion bonding with conventional needles for use in effecting superplastic expansion of said diffusion bonded stack during said subsequently performed superplastic forming process.

2. In a stack of sheets of titanium alloy materials including gas-conveying circular passageways extending from the interior of the stack to the ambient, a method of using dummy needles to maintain the circular shape of said passageways, comprising:

inserting a dummy needle in each stack passageway,
performing diffusion bonding
removing the dummy needles
reaming out said each passageway to ensure a circular shape; and
fitting said each reamed out passageway with needles adapted for superplastic forming.

3. The method of claim 1, and further comprising securing said housing on a retort sheet in a location proximate the periphery of said stack of sheets, wherein each said protective housing includes a solid block having an arcuate recess configured for snugly receiving said gas needle free end.

4. The method of claim 1, wherein said step of disposing said crush-proof housing adjacent said needle free end comprises first locating said free end within an arcuately configured recess in said housing and then securing said housing to an inner surface of said retort, said housing being of a height which is at least as great as the outer diameter of said needle end.

5. The method of claim 4, wherein said step of disposing said crush-proof housing adjacent said needle free end further includes securing said housing to at least one of a top or bottom retort sheet before sealing said retort sheets to form said protective retort.

6. The method of claim 1, wherein said step of replacing said dummy needles after completion of said diffusion bonding process comprises first removing said dummy needles from said passageways and then reforming said passageway to provide a cylindrical opening.

7. The method of claim 5, wherein said step of reforming said passageway comprises reaming out said passageway to eliminate any deformation of said originally cylindrical passageway incurred during said diffusion bonding process.

* * * * *